United States Patent [19]

Shiraki et al.

[11] 4,383,093
[45] May 10, 1983

[54] TUBULAR POLYMERIZATION REACTOR, AND PROCESS FOR POLYMERIZATION

[75] Inventors: Shigemi Shiraki; Saiji Nakano, both of Iwakuni, Japan

[73] Assignee: Mitsui Petrochemical Industries Ltd., Tokyo, Japan

[21] Appl. No.: 270,092

[22] Filed: Jun. 3, 1981

[30] Foreign Application Priority Data

Jun. 4, 1980 [JP] Japan .................................. 55-74377

[51] Int. Cl.³ .......................... C08F 2/00; C08F 10/00
[52] U.S. Cl. ..................................... 526/64; 422/135; 526/88; 526/125; 526/901
[58] Field of Search ..................................... 526/64, 88

[56] References Cited

U.S. PATENT DOCUMENTS

| | | | |
|---|---|---|---|
| 2,894,824 | 7/1959 | Tanning | 526/88 |
| 3,254,070 | 5/1966 | Poelen | 526/65 |
| 3,535,280 | 10/1970 | Schnell et al. | 526/64 |
| 4,188,470 | 2/1980 | Collina et al. | 526/125 |

FOREIGN PATENT DOCUMENTS

1442688 11/1968 Fed. Rep. of Germany .

*Primary Examiner*—Edward J. Smith
*Attorney, Agent, or Firm*—Sherman & Shalloway

[57] ABSTRACT

A tubular polymerization reactor comprising a feed opening for a polymerizable material at one end portion, a withdrawal opening for the resultant polymer at the other end portion, a tubular reaction space within the reactor extending from said feed opening to said withdrawal opening, and a rotary conveying member disposed within the reaction space and extending therealong with some clearance from the inner wall surface of the polymerization reactor; characterized in that
  (i) the length-to-diameter ratio of the tubular reaction space is about 20 or more, and
  (ii) the rotary conveying member is of a tubular coil-like shape;
and a process for polymerization using the aforesaid tubular polymerization reactor.

9 Claims, 4 Drawing Figures

TUBULAR POLYMERIZATION REACTOR, AND PROCESS FOR POLYMERIZATION

This invention relates to a tubular polymerization reactor which is simple in structure and easy to build and can be installed in a small floor space, and also to a process for polymerization using the aforesaid tubular polymerization reactor. According to this tubular polymerization reactor, heat in the polymerization zone can be controlled easily, and the occurrence of reactor blockage is unlikely. Furthermore, a properly extended and uniform residence time can be ensured, and the tubular polymerization reactor exhibits a transporting action and effect accompanied by an improved uniformly mixing-flowing action which can impart highly uniform reactivity.

The tubular polymerization of this invention can be utilized advantageously in the polymerization of olefins and a broad range of other polymerizable materials in a desired phase such as a vapor phase, liquid phase (including suspended phase) or a gas-liquid mixed phase, and there is no particular restriction on the polymerizable materials or the mode of polymerization. It is to be understood that the term "polymerization", as used herein, denotes not only homopolymerization, but also copolymerizations including random copolymerization, block copolymerization, graft copolymerization, etc., and the term "polymer", as used herein, denotes not only a homopolymer but also a copolymer.

Since the tubular polymerization reactor and the polymerization process of this invention are particularly suitable for application to the polymerization of olefins, they will be described below with particular reference to the polymerization of olefins.

For example, in the polymerization of olefins in the presence of Ziegler-type catalysts, the residence time can be made uniform by employing a batchwise polymerization method. If, however, a continuous polymerization method advantageous to industrial production is employed, a distribution occurs in the residence time of the catalyst particles, and the resulting polymer becomes non-uniform, resulting sometimes in degraded polymer properties. Another disadvantage is that those catalyst particles which have a short residence time and have not fully participated in the polymerization are discharged as fine particles. It is known that the use of a tubular polymerization reactor is advantageous in overcoming this disadvantage. In the tubular polymerization reactor, the heat of polymerization is usually removed by using a jacket or the like and cooling the polymerization reactor externally. If it is desired to increase the coefficient of heat conduction of the wall of the polymerization reactor while maintaining a uniform flowing condition within the reactor in gas-phase polymerization, it is necessary to decrease the diameter of the tubular reactor and increase the flow rate within the tubular reactor. Consequently, to obtain an industrially satisfactory reactor ability, a very long tube which is not practical becomes necessary. In view of pressure drops, etc. within the tube, it has been impossible to provide a tubular apparatus and an operation therefor which can be utilized in industrial practice.

Various suggestions have been made about tubular polymerization reactors and polymerizations using them, but all of these prior suggestions have various technical troubles. It has been desired therefore to develop a tubular polymerization reactor and a polymerization process which can be advantageously used in industrial practice.

For example, Japanese Patent Publication No. 1338/1966 (corresponding to U.S. Pat. No. 3,310,600) discloses a process for the continuous polymerization of ethylene and for use in the process, a spiral elongated tubular polymerization reactor. The elongated tubular polymerization reactor in this patent does not include a rotary conveying member. When polymerizations involving a polymerization system containing solid polymer particles, such as gas-phase polymerization or suspension-polymerization, are carried out using this polymerization reactor, the elongated tube will be blocked and the polymerizations cannot be continuously carried out.

Japanese Patent Publication No. 30831/1972 (corresponding to U.S. Pat. Nos. 3,595,846 and 3,773,470) discloses a polymerization process using a tubular reactor having many balls therein, and Japanese Patent Publication No. 26759/1977 (corresponding to British Pat. No. 1,475,201) discloses a continuous polymerization reaction in which a tubular reactor having a plurality of annular tubes is used. The reactors disclosed in these patent documents do not include a rotary conveying member extending along the tubular reaction space. When gasphase polymerization, for example, is carried out using these polymerization reactor, it is difficult, because of the need to remove the heat of polymerization, to increase the speed of polymer production per unit polymerization space volume.

Japanese Laid-Open Patent Publication No. 111384/1978 (corresponding to U.S. Pat. No. 4,188,470) proposes a process for polymerizing ethylene in the gaseous phase, in which in order to remove the trouble of removing the heat of polymerization as mentioned above, the polymer particles are carried on the gaseous monomer and passed through a tubular reactor at high speed. The tubular reactor in this patent document neither includes a rotary conveying member extending along the tubular reaction space. In order to obtain the desired amount of polymer in accordance with the disclosure of this patent document, a very long tubular reactor which is not feasible for practical applications is required, and the concentration of solid polymer particles in the polymerization system cannot be maintained high.

Figure 4:
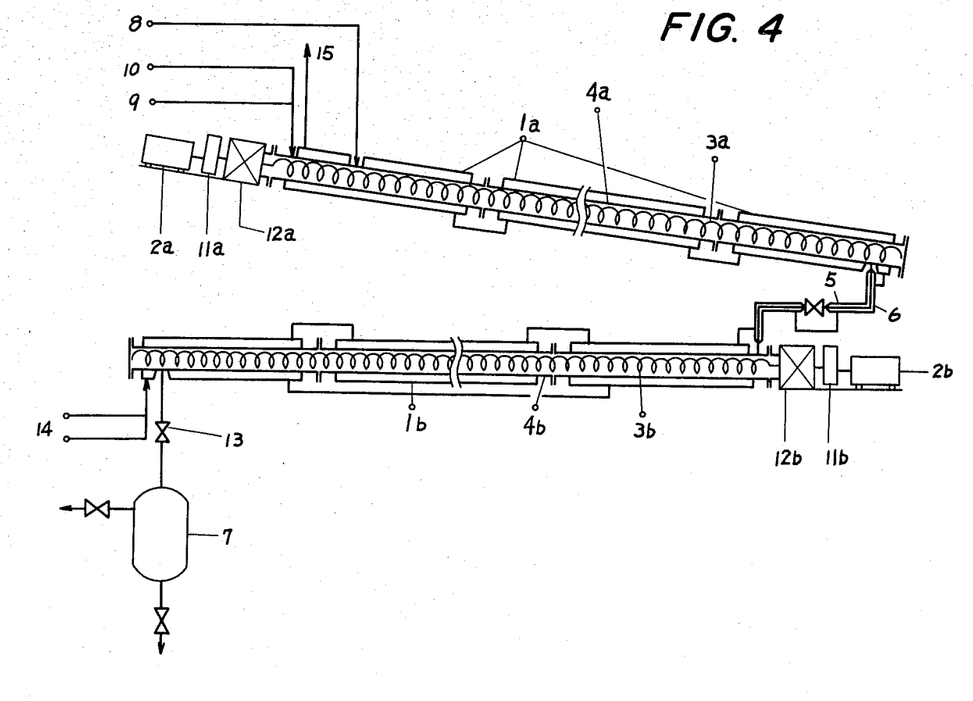
FIG. 4 is a view showing another example of connecting a plurality of unit tubular polymerization reactors.

Japanese Patent Publication No. 8989/1958 (corresponding to U.S. Pat. No. 3,254,070) discloses a gaseous-phase polymerization process using a tubular reactor which includes a rotary conveying member disposed in a tubular reaction space and extending there along with some clearance from the inner wall surface of the reactor. FIG. 4 of this patent shows an extruder-type polymerization reactor having a screw conveyor as the rotary conveying member. This patent document neither discloses the utilization of a tubular coil-like rotary conveying member. In the extruder-type polymerization reactor, the ratio of the length to diameter of the tubular reaction space is only about as low as 7. In this extruder-type polymerization reactor, a conveying effect by the conveying action of screw blades of the screw extruder can be expected, but a conveying effect accompanied by a satisfactory uniformly mixing-flowing action cannot be expected. Furthermore, industrial-scale practice of the polymerization in this reactor is difficult from the standpoint of heat control of a flow of the polymerization reaction mixture, and a uniform residence time is difficult to secure. Moreover, an agglomerated mass of the polymer tends to form on the screw shaft portion. Hence, this technique is disadvantageous both in apparatus and operation.

It has now been found in accordance with this invention that the disadvantages of the prior art techniques discussed above can be overcome by providing a tubular coil-like rotary conveying member in a tubular reaction space of a tubular reactor and maintaining the length-to-diameter ratio of the tubular reaction space at about 20 or more.

It has also been found that an excellent polymerization effect can be achieved by performing polymerization in the aforesaid tubular reactor while rotating the tubular coil-like rotary conveying member at a peripheral speed of not less than about 0.3 m/sec.

It is an object of this invention to provide a markedly improved tubular polymerization reactor which is simple in structure and easy to build, can be installed in a small floor space, permits an easy control of the heat of polymerization, is being free from blockage, can ensure a properly extended and uniform residence time and exhibits a transporting action and effect accompanied by an improved uniformly mixing-flowing action that can impart highly uniform reactivity.

Another object of this invention is to provide a process for polymerization using the aforesaid tubular polymerization reactor.

The above and other objects and advantages of this invention will become more apparent from the following description.

According to this invention, there is provided a tubular polymerization reactor comprising a feed opening for a polymerizable material at one end portion, a withdrawal opening for the resultant polymer at the other end portion, a tubular reaction space within the reactor extending from said feed opening to said withdrawal opening, and a rotary conveying member disposed within the reaction space and extending therealong with some clearance from the inner wall surface of the polymerization reactor; characterized in that (i) the length-to-diameter ratio of the tubular reaction space is about 20 or more, and
(ii) the rotary conveying member is of a tubular coil-like shape.

According to another aspect of the invention, there is provided a polymerization process, which is characterized in that (A) the polymerization is carried out in the aforesaid tubular polymerization reactor, and
(B) the polymerization is carried out while the peripheral speed of a cylinder defined by the tubular coil-like conveying member is not less than about 0.3 meters/sec.

The apparatus and process of this invention will be described in greater detail with reference to the accompanying drawings in which.

Figure 1:
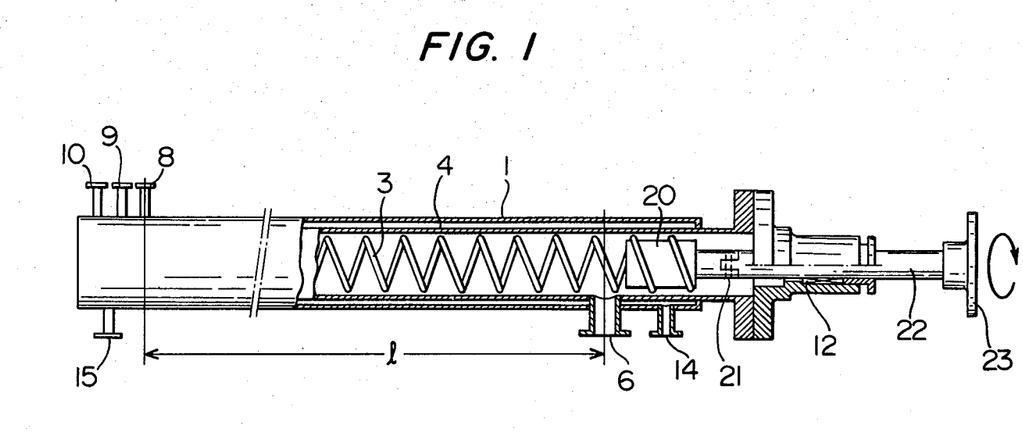
FIG. 1 is a front elevation of one example of the tubular polymerization reactor of the invention used for polymerization of olefins.

In FIG. 1, the tubular polymerization reactor is partly broken away, and partly shown in cross section along the axis of the tube. The tubular polymerization reactor is shown at 4 and includes a feed opening 8 for a polymerizable material and a withdrawal opening 6 for the resultant polymer. The polymerization reactor has a tubular reaction space defined by the inner wall of the vessel 4 and extending from the feed opening 8 to the withdrawal opening 6 (over the distance l shown in the drawing). A tubular coil member 3 as a rotary conveying member is disposed within the tubular reaction space and extends therealong with some clearance from the inner wall surface of the reactor 4. In FIG. 1, the coil member 3 is shown by its front elevation and not by its cross section. At least one end portion of the tubular coil member 3 is secured to a rotary head 20 fixed to the end of a rotary shaft 22. The tubular coil member 3 can be rotated by rotating the rotary shaft 22 by a suitable drive means (not shown).

The rotary shaft 22 and the rotary head 20 are connected through a coupling 21, and driven through a coupling 23, in the embodiment shown in FIG. 1. A seal portion 12 is provided to prevent leakage of the contents from the polymerization reactor. The securing of the coil member 3 to the head 20 and the connection of the head 20 to the rotary shaft 22 can be changed or modified easily by those skilled in the art. Such changes or modifications are within the scope of the present invention.

Furthermore, as required, a fluid flowing port through which to pass a flashing fluid may be provided in that part of the polymerization reactor 4 which has the coupling 21 provided therein. This flashing fluid serves to prevent the coming of the resultant polymer into the space between the rotary head 20 and the polymerization reactor 4.

In the embodiment shown in FIG. 1, a cooling or heating jacket 1 for a cooling or heating medium is provided on the peripheral surface of the tubular polymerization reactor 4. The jacket has an inlet 14 and an outlet 15 for introducing a cooling medium or a heating medium. In the embodiment shown in FIG. 1, a catalyst feed opening 10 and a feed opening 9 for feeding a molecular weight controlling agent are also provided near the feed opening 8 for the polymerzable material. If desired, the feed opening 8 for the polymerization material may be caused to act concurrently as one or both of these additional openings. Or in addition to the opening 8, an additional opening for supplying a comonomer, for example, may be provided so that it is open into any desired position of the tubular reaction space.

Figure 2:
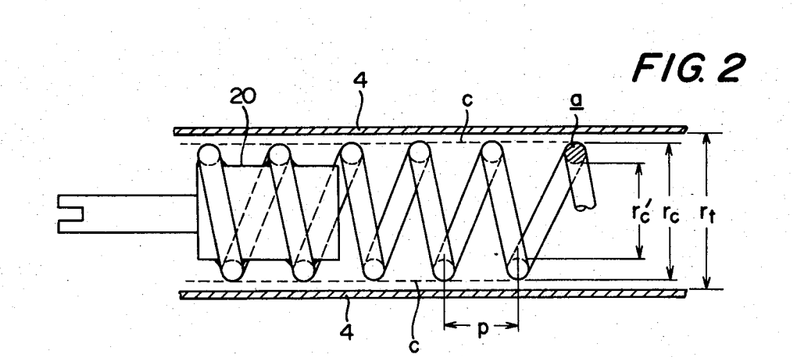
FIG. 2 is a partial enlarged sectional view of one example of the rotary tubular coil-like member shown in FIG. 1.

Now, referring to FIG. 2, a represents the cross sectional area of a wire constituting the coil member 3; c in dotted line represents a cylinder defined by the coil member 3; $r_c$ represents the outside diameter of the aforesaid cylinder; and $r_t$ represents the inside diameter of the polymerization reactor 4, i.e. the diameter of the tubular reaction space. Accordingly, the cross sectional area of the tubular reaction space denotes the cross-sectional area of a circle having a diameter $r_t$. $r_c'$ denotes the inside diameter of the cylinder c defined by the coil member 3.

In the tubular polymerization reactor of this invention, the clearance between the inner wall surface of the reactor and the rotary tubular coil member 3 denotes one half of the difference between $r_t$ and $r_c$. This clearance can be properly changed, and is, for example, about 0.1 cm to about 2 cm.

In the tubular polymerization reactor of this invention the length (l)-to-diameter ($r_t$) ratio of the tubular reaction space is about 20 or more, preferably about 40 or more. If this ratio is less than about 20, it is extremely difficult to secure a proper extended and uniform residence time of a flow of the polymerization reaction mixture, and the advantage of using the tubular reactor is markedly reduced. Another disadvantage is that a heat control of the flow of the polymerization reaction mixture becomes insufficient (the removal of heat is insufficient in the case of olefin polymerization), and the amount of the polymer yielded per unit time cannot be increased. There is no particular upper limit to the length (l)-to-diameter ($r_t$) ratio, but for example, a length-to-diameter ratio of up to about 5,000 is sufficient. In the present invention, a plurality of unit tubular polymerization reactors may be connected, and in this embodiment, each of the unit reactors should desirably meet this requirement.

Advantageously, the occupying space volume of the rotary tubular coil member 3 is as small as permissible from the standpoint of the strength of the coil member, its stability in rotation, etc. The tubular polymerization reactor of this invention is designed so that the ratio of the cross-sectional area a of a wire constituting the coil member 3 to the cross-sectional area of the tubular reaction space (the cross sectional area of a circle having a diameter $r_t$) is preferably up to about 1/16, more preferably up to about 1/25. There is a lower limit to this ratio from the aforesaid standpoint, which is, for example, about 1/1000. Preferably the above ratio is about 1/50 to about 1/1000.

The diameter ($r_t$) of the cross section of the tubular reaction space in the tubular polymerization reactor 4 can be properly selected, and is, for example, preferably about 15 to about 300 mm, more preferably about 20 to about 200 mm. The lower limit of the diameter ($r_t$) is determined automatically in view of the strength of the rotary tubular coil member 3 located within the space. If the diameter ($r_t$) becomes too large, heat control, for example the removal of heat from the tubular wall, becomes difficult. Hence, the diameter ($r_t$) within the above-exemplified range is preferred.

The tubular coil member 3 may be made of various suitably selected materials, such as carbon steel, stainless steel, and alloys containing Ni, Cr, Co, Ti, etc. as a main ingredient.

In the tubular polymerization reactor of this invention, the ratio of the outside diameter ($r_c$) of the cylinder (c) of the tubular coil member 3 to the diameter ($r_t$) of the cross section of the tubular reaction space is preferably from about 0.7 to 0.95, more preferably from about 0.75 to about 0.9. The pitch (p in FIG. 2) of the tubular coil member 3 can be properly selected, but preferably, all pitches are equal and are about 0.3 to about 1.5 times, more preferably about 0.4 to about 1.2 times, the outside diameter ($r_c$) of the coil member 3.

In the embodiments shown in FIGS. 1 and 2, the rotary head 20 and the rotary shaft 22 can be connected by any desired means, for example by screw connection, flange connection or spline connection. The other end (not shown) of the coil member 3 connected to the rotary head 20 in FIG. 1 is usually a free end, but if desired, may be caused to terminate in a receiver member, which does not hamper the rotation of the coil member 3, by means known per se, for example by a thrust bearing which exerts tension stress on the coil member 3.

The tubular polymerization reactor of this invention may be used as a single unit. Or a plurality of unit polymerization reactors may be connected suitably, for example in a series alignment, a parallel alignment, a circulating circuit, or in a combination of such arrangements.

Figure 3:
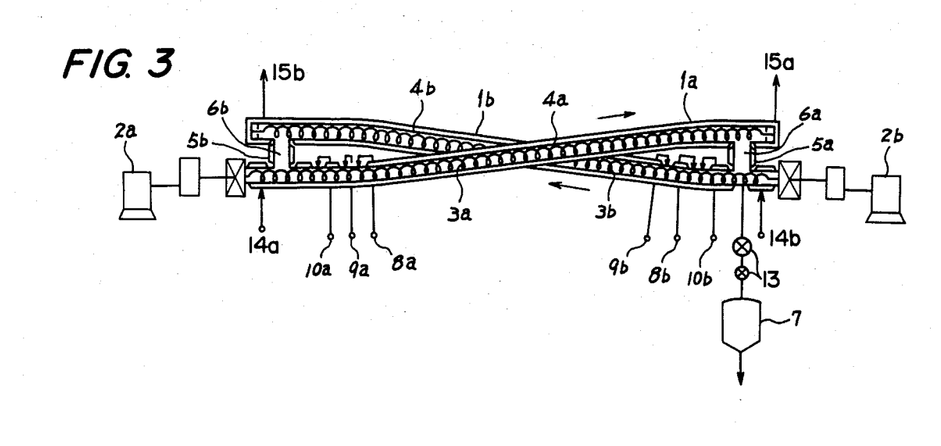
FIG. 3 is a view showing an example of connecting a plurality of unit tubular polymerization reactors.

FIGS. 3 and 4 show examples of connecting a plurality of unit polymerization reactors. In FIG. 3, two tubular polymerization reactors are connected to each other to form a circulating circuit in which the upstream end of one tubular reaction space is connected to the downstream end of the other tubular reaction space. In FIG. 4, two unit polymerization reactors are connected to each other in series.

In FIG. 3, two tubular polymerization reactors 4a and 4b have cooling jackets 1a and 1b respectively which are gently inclined upwardly toward the downstream side of the tubular reaction space are connected to each other so that the upstream side of the tubular reaction space of one polymerization reactor communicates with the downstream side of the tubular reaction space of the other polymerization reactor by means of passages 6a and 6b, respectively. As a result, there is formed a circulating circuit through which a flow of the polymerization reaction mixture within the reaction space can be circulated. Cooling jackets 5a and 5b are also provided on the external wall surfaces of the passages 6a and 6b respectively. A discharge drum 7 for withdrawing the resultant polymer out of the system is provided below the passage 6a connecting the downstream side of a first unit polymerization reactor to the upstream side of a second unit polymerization reactor. The reference numerals 15a 15b represent outlets for a cooling medium, and 14a and 14b, inlets for the cooling medium.

In the unit polymerization reactors 4a and 4b, feed lines 8a, 8b, 9a, 9b, 10a, and 10b are provided for feeding a monomer, a molecular weight controlling agent, a catalyst, etc.

In a steady state of continuous polymerization, a cooling medium, for example cooling water, is caused to flow through the cooling jackets, the tubular coil members 3a and 3b are rotated, and a flow of the polymerization reaction mixture containing the resultant polymer is conveyed to the downstream side of each reaction space. The monomer, molecular weight controller and catalyst are continuously fed, and the monomer and molecular weight controller are consumed while they advance downstream in the polymerization reactor, whereby the polymer is formed in the form of particles on the surface and inside surface of the catalyst. A discharge valve 13 is adjusted so that the level of the polymer powder in the passage 6a is maintained constant, and the polymer is continuously (or intermittently) discharged into the discharge drum 7. The remaining polymerization reaction mixture flow is recycled to the upstream side of the polymerization reactor 4a after passage through the polymerization reactor 4b.

Stable continuous operation is possible if the rotating speed of a motor 2a is adjusted to that the level of the powder in the passage 6b becomes constant. The unreacted monomer or molecular weight controller is received by the discharge drum 7 together with the polymer. The unreacted monomer, etc. may be withdrawn by providing a pressure-adjusting valve, for example, in the passages 6a and 6b. The entrained unreacted monomer or molecular weight controller may be recycled to the polymerization reactors 4a and 4b.

In the embodiment shown in FIG. 3, two polymerization reactors are used. More polymerization reactors may be used in series or in parallel. By changing the type or amount of the monomer to be fed from the feed opening, block copolymerization may be performed, or the distribution of the molecular weight or chemical composition of the polymer may be adjusted.

If, in the circulating-type apparatus shown in FIG. 3, the number of circulating cycles (in terms of the weight of the circulating polymer/the weight of the discharged polymer... the number one means a one-pass reactor or a non-circulating type reactor) is too large, mixing approaches complete mixing, and therefore, the advantage of utilizing the tubular reactor is sometimes reduced. Accordingly, the number of circulating cycles should desirably be selected properly. For example, the number of circulating cycles in terms of the aforesaid ratio is about 1.05 to about 6, preferably about 1.2 to about 4. FIG. 4 shows two unit tubular polymerization reactors for liquid-phase reaction which are connected to each other in series in such a way that they are gently inclined downwardly toward the downstream side of the tubular reaction space. The two unit tubular polymerization reactors 4a and 4b include therein tubular coil members 3a and 3b respectively driven by motors 2a and 2b. Externally of the tubular polymerization reactors are provided reduction gears for rotating the coil members at predetermined rotating speeds and shaft sealing devices 12a and 12b for preventing leakage of liquid from the inside of the tubular polymerization reactors. Cooling jackets 1a and 1b for removing the heat of polymerization are provided on the outside surfaces of the tubular polymerization reactors 4a and 4b. The downstream side of the tubular polymerization reactor 4a is connected to the upstream side of the tubular polymerization reactor 4b through a passage 6 having a cooling jacket 5 so that a flow of the reaction mixture can be passed between them. A discharge drum 7 is disposed beneath the tubular reactors so as to discharge the polymer out of the polymerization system.

Lines 8, 9 and 10 are provided in the tubular polymerization reactor 4a for feeding the monomer, solvent and catalyst, respectively.

In the steady state of continuous polymerization, a cooling medium, for example water, is caused to flow through each of the cooling jacket to remove the heat of polymerization. When the polymerization is carried out at a high temperature, saturated water, or both saturated water and steam may be used as the cooling medium. The coil members 3a and 3b are driven in the aforesaid steady state. In the embodiment shown in FIG. 4, the winding direction of the coil member is clockwise, or right-handed, and the direction of its rotation is also clockwise when viewed from the driving side. The monomer, solvent and catalyst are continuously fed through the lines 8, 9 and 10, and the monomer is consumed as it advances downstream in the tubular polymerization reactor, thus forming a polymer. By adjusting the discharge valve 13 so that the pressure of its upstream side becomes constant, the polymer is continuously (or intermittently) discharged into the discharge drum 7.

According to the process of this invention, it is essential that (A) the polymerization be carried out in the tubular polymerization reactor which meets the aforesaid requirements (i) and (ii), and that (B) the polymerization be carried out while the peripheral rotating speed of a cylinder (c) defined by the tubular coil member is not less than about 0.3 m/sec. The peripheral speed is preferably not less than about 0.5 m/sec, more preferably not less than about 0.7 m/sec. The limit to the peripheral speed can be properly selected, and is, for example, about 7 m/sec, more preferably about 4 m/sec.

According to the process of this invention, polymerization is carried out in the flow of the polymerization reaction mixture by the conveying action of the tubular coil member 3 at the above rotating speed which is accompanied by a mixing-flowing action. By the rotation of the tubular coil member 3, there can be obtained a conveying action accompanied by the sufficient stirring-mixing action of the tubular reaction space in its cross-sectional direction, and both a uniform mixing effect of the flow of the polymerization reaction mixture and a properly extended and uniform residence time can be secured.

The rotating speed of the tubular coil member 3 can be suitably controlled, and usually, rotating speeds of about 60 to about 2,000 rpm can, for example, be used. Even where it is difficult to remove a large amount of heat from the wall of the tubular polymerization reactor, for example in the case of the gaseous-phase polymerization olefins, the high-speed rotation of the coil member 3 at the peripheral speed (B) makes it possible to reduce the thermal resistance of the boundary layer even if the apparent flow rate of the polymer in the lengthwise direction of the tubular reactor is small. Accordingly, by simply providing a cooling jacket or line on the outside wall of the polymerization reactor, the heat of polymerization can be removed fully from the wall of the tube, and consequently, the polymerization process can be simplified.

The process of this invention is particularly suitable for application to polymerizations which yield solid polymer particles, for example gas-phase polymerization or suspension polymerization. It is very effective when applied to the gas-phase polymerization in which the removal of the heat of polymerization is difficult, and a great amount of ingenuity is required in transferring or stirring solid particles. Furthermore, it is especially effective when applied to a system in which the rate of polymerization is very high and the therefore the removal of heat must be performed rapidly.

The process of this invention can be applied to the homopolymerization or copolymerization (random copolymerization or block copolymerization) of various monomers. For example, it may typically be applied to the homopolymerization of olefins, or the copolymerization of olefins with each other or with other comonomers. The olefins that may be used in the polymerization process are those having 2 to 10 carbon atoms such as ethylene, propylene, 1-butene, 1-pentene, 1-hexene, 1-octene, 1-decene, 4-methyl-1-pentene, 3-methyl-1-pentene, styrene, $\alpha$-methylstyrene, butadiene, isoprene, 1,4-hexadiene, dicyclopentadiene, and 5-ethylidene-2-norbornene.

A catalyst composed of a transition metal compound catalyst component and an organometallic compound catalyst component may, for example, be used in the polymerization of olefins.

The transition metal catalyst component is a compound of a transition metal such as titanium, vanadium, chromium or zirconium which may be liquid or solid under conditions of use. It needs not to be a single compound, and may be carried on, or mixed with, another compound. Or it may also be a complex compound with another compound. A preferred transition metal catalyst component is a highly active transition metal compound catalyst component capable of producing at least about 5,000 g, especially at least about 8,000 g, of an olefin polymer per millimole of transition metal. A typical example is a titanium catalyst component highly activated by a magnesium compound. It is especially preferred that the present invention be applied to the polymerization of olefins in the presence of a transition metal compound catalyst component capable of producing at least 5,000 g, especially at least about 8,000 g, of a polymer per millimole of transition metal for the first 20 minutes.

An example of such a transition metal catalyst component is a solid titanium catalyst component consisting essentially of titanium, magnesium and halogen which contains amorphous magnesium halide and a specific surface area of preferably at least about 40 m$^2$/g, especially preferably about 80 to about 800 m$^2$/g. It may also contain an electron donor such as an organic acid ester, acid halide, acid anhydride, ketone, acid amine, tertiary amine, inorganic acid ester, phosphoric acid ester, phosphorus acid ester, or ether. Preferably, this catalyst component contains about 0.5 to about 10% by weight, especially about 1 to about 8% by weight, of titanium and has a titanium/magnesium atomic ratio of from about ½ to about 1/100, especially from about ⅓ to about 1/50, a halogen/titanium atomic ratio of from about 4 to about 100, especially from about 6 to about 80, and an electron donor/titanium mole ratio of from 0 to about 10, especially from 0 to about 6. Various suggestions have been made and known about these catalyst components. Among these, an especially preferred catalyst component is a solid catalyst component which has an average particle diameter of about 3 to about 100 microns, preferably about 5 to about 50 microns, and a geometrical standard deviation in particle size distribution of less than 2.1, preferably not more than 2.0 because the use of this catalyst component makes the polymerization operation easier and gives a polymer having a good particle size distribution.

The organometallic compound catalyst component is an organometallic compound in which a metal of Groups I to III of the periodic table is directly bonded to carbon. Examples include organic compounds of alkali metals or alkaline earth metals, and organoaluminum compounds. Specific examples are alkyllithiums, arylsodiums, alkylmagnesiums, arylmagnesiums, alkylmagnesium halides, arylmagnesium halide, alkylmagnesium hydrides, trialkyl aluminums, alkylaluminum halides, alkylaluminum hydrides, alkylaluminum alkoxides, alkylthium aluminums, and mixtures of these.

In addition to the aforesaid two catalyst components, an electron donor catalyst component, such as an organic acid ester, inorganic acid ester, carboxylic acid halide, carboxylic acid amide, tertiary amine, acid anhydride, ether, ketone or aldehyde, may be used to control the stereospecificity, molecular weight, molecular weight distribution, etc., of the polymer. This component may be used as a complex or adduct of the organometallic compound catalyst component. Or it may be used in the form of a complex or adduct with another compound, such as a Lewis acid (e.g., aluminum trihalides).

By properly selecting the winding direction and the rotating direction of the coil member 3, the feeding direction generated by the rotation of the tubular coil member 3 may be adjusted to a direction moving from that end portion of the member 3 which is secured to the rotary head toward the other end portion of the member 3, or a direction moving from the aforesaid other end portion toward the rotary head side. These feeding directions can be selected as desired.

Thus, in the present invention the direction in which the flow of the polymerization reaction mixture is conveyed may be reverse to, or the same as, the feeding direction resulting from the rotation of the tubular coil member 3. When in the former embodiment, the feeding direction of the tubular coil member is that moving from the aforesaid end toward the rotary bed side, tensile stress acts on the coil member 3, bringing about the advantage of stabilizing the actuation of the coil member 3 and reducing the powder required for driving the coil member 3. This is especially outstanding when the flow of the polymerization reaction mixture is a fluid having a relatively high viscosity. This embodiment also has the advantage that the stirring-mixing action in the tubular reaction space is better, and the effect of heat condition through the wall of the tubular polymerization reactor becomes better.

In performing the process of this invention, the average flow rate of the flow of the polymerization reaction mixture can be properly selected. It is preferably about 0.03 to about 0.8 m/sec, more preferably about 0.05 to about 0.5 m/sec.

In polymerization, the tubular coil member 3 is rotated at the desired rotating speed while controlling the temperature by passing a cooling medium such as water through a jacket provided externally of the polymerization reactor, and a gaseous monomer such as an olefin and if required, a catalyst such as the catalyst components described hereinabove are fed into the polymerization reactor continuously, whereby polymer particles are formed in the tubular reaction space. The resultant polymer is withdrawn in a fixed amount from the polymerization reactor to obtain it as a final product. In a system in which a small amount of catalyst is used, for example in the case of olefin polymerization, a part of the product is recycled so as to perform transportation of the catalyst smoothly. This enables more stabilized operation.

In the gas-phase polymerization of olefins, the amount of the transition metal catalyst component is, for example, about 0.0001 to about 1 millimole calculated as transition metal per liter of reaction volume, and the atomic ratio of the metal of the organometallic compound to the transition metal is maintained at about 1 to about 2,000. The polymerization is carried out preferably below the melting point of the polymer and between about 20° C. and about 100° C. In polymerization, a molecular weight controlling agent such as hydrogen may be used. The olefin, molecular weight controlling agent and the catalyst components may be fed separately at two or more portions. The polymer concentration is maintained at about 30 to about 400 kg/m$^3$, preferably about 50 to about 350 kg/m$^3$. If this concentration is too low, the coil member 3 collides with the inner wall of the polymerization reactor and tends to undergo water and breakage. If it is too high, transportation and stirring may sometimes fail. Accordingly, the concentrations within the above range are preferred.

Suspension polymerization may be carried out in the same way as in the gas-phase polymerization except that an inert solvent which will precipitate the polymer, for example a hydrocarbon or a halogenated hydrocarbon in olefin polymerization is used as a medium. The suspension polymerization may be carried out at any desired polymer concentrations so long as the transportation of the polymer particles can be effected easily. For example, the polymerization may be carried out under such conditions that about 30 to about 550 g, particularly about 50 to about 400 g, of the polymer is contained per liter of the suspension.

When a polymerization mode is employed in which a mixture of a gaseous phase and a liquid phase occurs in the tubular reaction space, the ratio of the volume flow rate of the gas to the total volume flow rate of the liquid and the gas is preferably maintained at about 0.05 to about 0.8 because this permits better heat conduction in the tubular wall of the polymerization reactor 4. In order to increase the flow rate of the velocity of the medium flowing inside the jacket and enhance the heat conducting effect, a continuous spiral plate may be provided within the jacket 1. Or a discontinuous baffle plate which will generate a turbulent flow in the fluid flow may be provided within the jacket 1.

According to this invention, the heat of polymerization can be easily removed even when the apparent flow velocity of the polymerization reaction mixture is not so large. Hence, the advantages of the tubular polymerization reactor can be exhibited fully without the need to extremely lengthen the tube. Furthermore because the residence time of the fed catalyst can be maintained constant, a product of uniform quality can be obtained in high yields.

The apparatus of this invention permits easy performance of stable continuous operation.

The following Examples illustrate the present invention more specifically.

EXAMPLE 1

There was used an apparatus of the type shown in FIG. 3 which consisted of two jacketed tubular polymerization reactors (4a and 4b) each having a diameter of 32 mm and a length of 15 m and including a tubular coil member 3 and an outside diameter of 23 mm and a pitch of 9 mm, which reactors were connected such that the upstream end of one polymerization reactor communicated with the downstream end of the other through a passage equipped with a cooling jacket. The length-to-diameter ratio of the tubular reaction space of each tubular polymerization reactor was 470, and the ratio of the cross-sectional area of the wire constituting the coil member to that of the tubular reaction space in each polymerization vessel was 1:41.

While passing cooling water through the cooling jackets 3.4 kg of polypropylene powder was charged into the tubular polymerization reactors 4a and 4b. This powder had an average particle diameter of 300 microns and a geometric standard deviation of 1.6. The coil member in each polymerization reactor was rotated at a speed of 1200 rpm. At this time, the peripheral speed of the coil member was 2.4 meters/sec. The inside of each polymerization reactor was maintained in an atmosphere of nitrogen gas.

A spherical solid catalyst component containing 20.0% by weight of magnesium, 4.0% by weight of titanium, 59% by weight of chlorine and 12.3% by weight of ethyl benzoate and having an average particle diameter of 13 microns and a geometrical standard deviation in particle size distribution of 1.35 was suspended in butane. The resulting catalyst slurry was continuously fed into the polymerization reactor through line 10b at a flow rate of 1.8 g/hr (1.5 millimoles/hr cl calculated as titanium tom). Simultaneously, methyl p-toluate and triethyl aluminum were supplied to the catalyst line at a rate of 0.063 mole/hr and 0.188 mole/hr, respectively. Simultaneously, hydrogen and propylene gas were continuously fed into the polymerization reactor from separate nozzles at positions immediately downstream of the catalyst feed opening. The flow rates of propylene gas and hydrogen were maintained at 9.6 $Nm^3/hr$ and 0.1 $Nm^3/hr$, respectively. The pressure was maintained at 7 $kg/cm^2$.G by means of a pressure-adjusting valve secured to intermediate pipe 6a. The temperature of the inside of the polymerization reactors and the temperature of the product were maintained at 70° C. by adjusting the amount of cooling water passed through the jackets. Separately, propylene gas was fed at a rate of 1.0 $Nm^3/hr$ to a part of the polymerization reactor. The temperature of the cooling water increased from 42° C. to 51° C.

The powder was withdrawn so that the level of the powder in the intermediate pipe 6a was maintained constant. The level of the powder in the intermediate pipe 6b was maintained constant by adjusting the rotating speed of the motor 2a. At the end of 6 hours from the starting of the operation, the amount of the powder was 15 kg/hr.

The powder had a boiling n-heptane extraction residue of 96.2%, a bulk density of 0.45 g/ml and a melt index of 5.2. The polymer had an average particle diameter of 320 microns and a geometric standard deviation of 1.5. Its yield calculated was 75%. The activity of the catalyst was about 10,000 g of polypropylene/mmole of Ti.

After the reaction, the concentration of the polymer in the polymerization reactor was 200 g/liter, the flow rate of the polymer was 0.06 m/sec, and the apparent number of circulating cycles was 2.3.

EXAMPLE 2

There was used an apparatus of the type shown in FIG. 4 which consisted of two jacketed tubular polymerization reactors each having a diameter of 27.2 mm and a length of 30 meters and including a coil member 3 with an outside diameter ($r_c$) of 22 mm and a pitch (p) of 20 mm, which polymerization reactors were connected to each other such that the downstream end of one reactor communicated with the upstream end of the other reactor through a jacketed intermediate pipe. Since in the early stage of the reaction, a gas phase and a liquid phase occurred, the first-mentioned tubular polymerization reactor was inclined downwardly at an angle of 2° to the horzizontal, and the other tubular polymerization reactor was maintained horizontal in order to prevent blowing-through of the gas. In each of the polymerization reactors, the length-to-diameter ratio of the tubular reaction space was maintained at 1100, and the ratio of the cross-sectional area of the wire forming the coil member to that of the tubular reaction space was adjusted to 1:30.

Saturated water and steam were passed through the jacket of the intermediate pipe and the jackets of the tubular polymerization reactors, and the pressure of the insides of these jackets was maintained at 7 $kg/cm^2$.G. Cyclohexane was passed downstream from the driving side at a rate of 31 liters/hr from nozzle 9. The temperature of the cyclohexane at the inlet was kept at 180° C., and the discharge valve 13 was adjusted so that the pressure within the tubular polymerization reactors was maintained at 60 $kg/cm^2$.G. The coil member was rotated at a speed of 500 rpm. At this time, the peripheral speed of the coil member was 57.5 cm/sec. The coil members used were winding clockwise, and were rotated clockwise.

A solid catalyst component containing 21.0% by weight of magnesium, 4.0% by weight of titanium and 66% by weight of chlorine was suspended in cyclohexane. The resulting catalyst slurry was continuously fed through lines 8 and 9 so that the catalyst component flowed at a rate of 0.696 g/hr (0.581 millimoles/hr), and cyclohexane flowed at a rate of 31 liters/hr. Simultaneously, triethyl aluminum was supplied to these lines at a flow rate of 20.1 millimoles/hr. Simultaneously, hydrogen, ethylene and 4-methylpentene-1 were continuously fed from separate nozzles to a nozzle 8 immediately downstream of the catalyst feed opening at a rate of 0.9 g/hr, 6.24 kg/hr, and 792 g/hr, respectively. Immediately after the initiation of the polymerization, the supplying of steam to the jackets was stopped, and saturated water at 170° C. was fed. The inside of the jacket was still maintained at 7 kg/cm$^2$.G (170° C.).

At the end of 6 hours from the initiation of the operation, the amount of the polymer discharged was 6.8 kg/hr. The polymer had a density of 0.917 g/cm$^3$, and an MI of 2.29. The activity of the catalyst was about 11,700 g of polyethylene/mmole of Ti. Analysis after the experiment showed that the conversion of ethylene was about 99%, and the conversion of 4-methylpentene-1 was about 73%. The final material discharged had a viscosity of about 1500 centipoises at 170° C. before flashing, and the concentration of the polymer was 200 g/liter.

What we claim is:

1. A process for polymerization in a tubular polymerization reactor comprising a feed opening for a polymerizable material at one end portion, a withdrawal opening for the resultant polymer at the other end portion, a tubular reaction space within the reactor extending from said feed opening to said withdrawal opening, and a rotary conveying member disposed within the reaction space and extending therealong with some clearance from the inner wall surface of the polymerization reactor, which comprises feeding the polymerizable material into said feed opening and withdrawing the resultant polymer from said withdrawal opening; characterized in that (A) in said polymerization reactor, (i) the length-to-diameter ratio of the tubular reaction space is about 20 or more, (ii) the rotary conveying member is a tubular coil-like shape, and (iii) the ratio of the outside diameter of a cylinder defined by the coil-like rotary conveying member to the diameter of the tubular reaction space is 0.7 to 0.9, and (B) the polymerization is carried out while the peripheral speed of a cylinder defined by the tubular coil-like conveying member is not less than about 0.3 meters/sec.

2. The process of claim 1 wherein the feed direction generated by the rotation of the tubular coil-like rotary conveying member is reverse to the direction in which the polymerization reaction mixture flows.

3. The process of claim 1 wherein the feed direction generated by the rotation of the tubular coil-like rotary conveying member is the same as the direction in which the polymerization reaction mixture flows.

4. The process of claim 1 wherein the polymerization is carried out while the average flow rate of the polymerization reaction mixture is maintained at about 0.03 to about 0.8 meter/sec.

5. The process of claim 1 wherein the polymerization is carried out while recycling a part of a flow of the polymerization reaction mixture on the downstream side of the polymerization reactor to the upstream side thereof.

6. The process of claim 5 wherein the number of circulations, in terms of the ratio of the weight of the circulating polymer to the weight of the withdrawn polymer is about 1.05 to about 6.

7. The process of claim 1 wherein the polymerization is carried out under gaseous-phase polymerization conditions.

8. The process of claim 1 wherein the polymerizable material is an olefin.

9. The process of claim 8 wherein the polymerization is carried out in the presence of a catalyst composed of a transition metal compound catalyst component and an organometallic compound catalyst component, said catalyst capable of forming at least about 5,000 g of an olefin polymer per millimole of transition metal.

* * * * *